E. G. BUDD.
METALLIC VEHICLE WHEEL.
APPLICATION FILED FEB. 25, 1913.
1,202,794.
Patented Oct. 31, 1916.
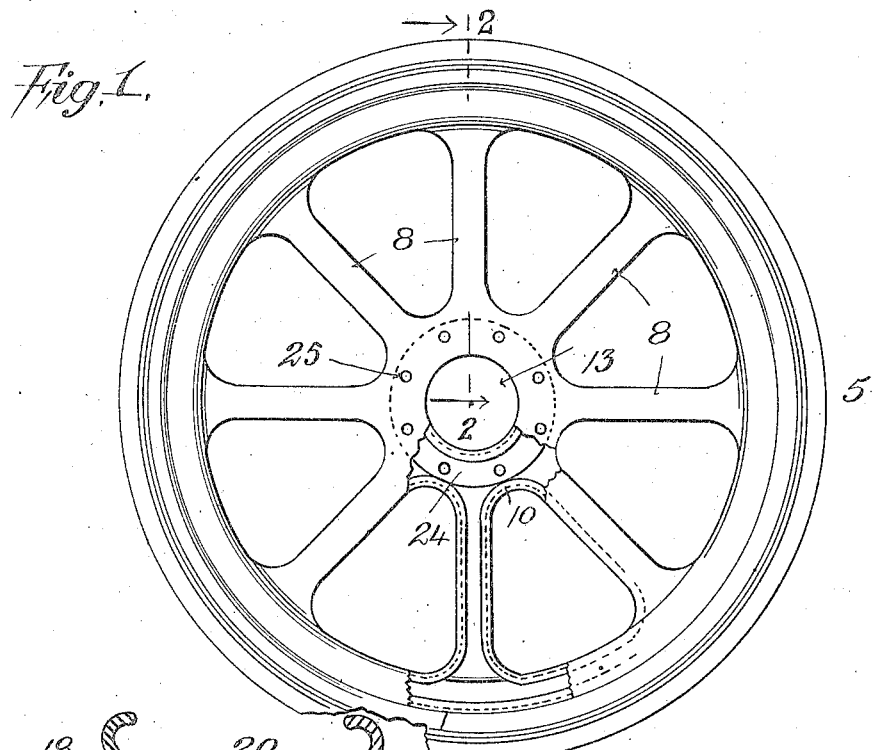
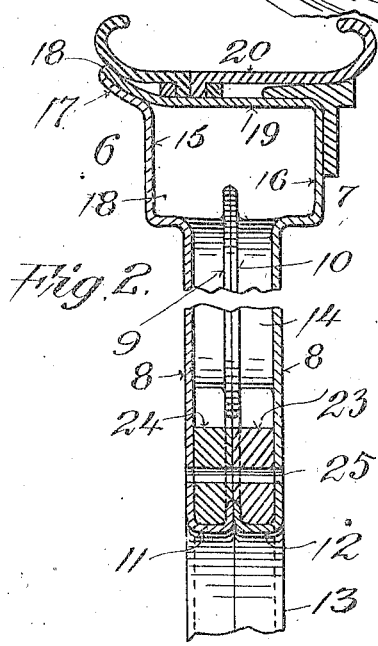
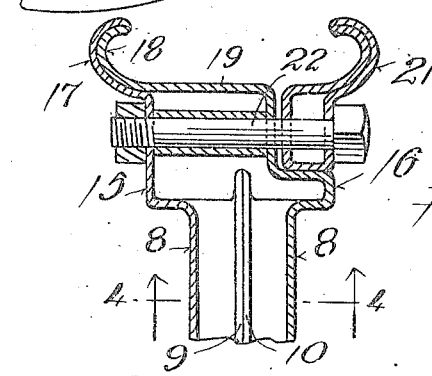
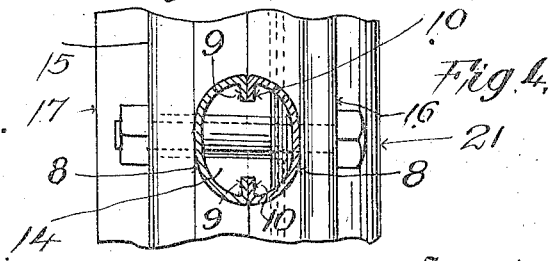
Witnesses:
Inventor
Edward G. Budd
By his Attorney
Samuel E. Darby

UNITED STATES PATENT OFFICE.

EDWARD GOWEN BUDD, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

METALLIC VEHICLE-WHEEL.

1,202,794.  Specification of Letters Patent.  Patented Oct. 31, 1916.

Application filed February 25, 1913. Serial No. 750,520.

*To all whom it may concern:*

Be it known that I, EDWARD G. BUDD, a citizen of the United States, residing at Philadelphia, in the county of Philadelphia, State of Pennsylvania, have made a certain new and useful Invention in Metallic Vehicle-Wheels, of which the following is a specification.

This invention relates to vehicle wheels and particularly to wheels made of sheet metal.

The object of the invention is to provide a construction of vehicle wheel which is simple, inexpensive to manufacture, and efficient, strong and durable in use.

A further object of the invention is to provide a metallic vehicle wheel having a symmetrical contour or outline.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claim.

Referring to the accompanying drawing and to the various views and reference signs appearing thereon, Figure 1, is a view in side elevation, parts broken out, showing the construction of a metallic wheel embodying the principles of my invention. Fig. 2, is a broken view, in section, on the line 2, 2, Fig. 1, looking in the direction of the arrows. Fig. 3, is a broken detail view in section, showing a slightly modified arrangement of channel to receive the tire. Fig. 4, is a broken detail sectional view, transversely of a wheel spoke, as indicated at 4, 4, Fig. 3, looking in the direction of the arrows.

The same part is designated by the same reference numeral wherever it occurs throughout the several views.

In carrying out my invention I propose to form the wheel of pressed sheet steel. In practice, I form the wheel in sections, preferably in halves, each half being formed with a central hub or axle opening, and with radial portions to form spokes, and a peripheral portion to form a channel to receive the tire. Each half or section of the wheel is pressed into shape out of sheet steel and preferably is formed in one single operation, being pressed into the desired configuration or shape. The sheet steel sections or portions, when pressed into the desired shape are then assembled together by bringing together suitable flanges formed thereon, and securing the same to each other. A pressed steel wheel, so formed, possesses the merit of simplicity of structure, strength and rigidity, and economy in the manufacture thereof, while at the same time presenting a symmetrical appearance. The peripheral portion of each section or half of the wheel is formed integrally with the spoke portions thereof, and with the central channel to form the axle opening, thus producing a convenient form of structure to manufacture. If desired, and in order to afford sufficient backing to secure the flange of the wheel hub to the wheel, a suitable solid filler is inserted in the channel formed by the spoke sections when they are joined to form the hub or axle opening in the wheel. The securing bolts for the hub flange pass through the filler pieces, thereby being firmly and securely held to the sheet steel wheel without danger of breaking or warping, or otherwise distorting the shape of the wheel or its spokes.

Now referring specifically to the structure shown, reference numeral 5 designates the wheel as a whole. This wheel is constructed of sections or portions, indicated generally at 7, and preferably in halves, of sheet steel. The sheet steel sections are pressed into the desired shape to form the spoke portions 8, having the flanges 9, 10, respectively thereon. Each sheet steel section or portion of the wheel, at the inner end of the spoke portions 8, thereof, is formed into channels, indicated at 11, 12, to form the opening 13, for the axle or hub bearing of the wheel. The lateral flanges 9, 10, formed on the spoke portions of each section or half of the sheet metal wheel are turned inwardly, as most clearly shown in Figs. 2, 3, and 4, so that when the sections or halves are brought together to form the whole, the flange 9, on the one section will bear against the flange 10, on the other section, said flanges being inside the hollow space 14, of the interior of the complete spoke, as clearly shown in the drawing. By reason of the flanges 9, 10, extending inwardly into the space inclosed by the spoke portions of the wheel sections, I am enabled to produce a wheel having a symmetrical contour or outline and wherein projecting portions or flanges are eliminated. The inwardly extending or projecting flanges 9, 10, after being brought together in assembling the two sections are welded or otherwise brazed or suitably secured together in order to retain the sections or halves of the wheels in assembled relation. Each section, or half of the pressed steel wheel, is formed with an integral peripheral portion 15, 16, forming the felly of the wheel. It is obvious that the felly portion of the wheel may have any suitable or convenient shape or configuration, adapted to receive or form a support for the channels or other clamping means for a rubber or other tire in the usual or any well known manner. In the form shown in Fig. 2, the flange or peripheral portion 15, of one of the sections is provided with a laterally extending lip 17, designed to coöperate with a similar lip or extension 18, of the peripheral portion 16 of the other half. When the two peripheral portions 15, 16, are brought together in assembled relation they form a peripheral chamber or space 18ª, the peripheral portion 16, extending radially and having an outturned horizontal portion 19, terminating in the lateral flange 18, which latter rests upon the lateral extending flange 17, of the peripheral portion 15, of the other section or half of the wheel, these two surfaces being thereupon welded or otherwise suitably secured together, thus forming a peripheral seat to receive the tire clamping and holding devices 20, which may be of any suitable or convenient type or construction.

If desired, and as shown in Fig. 3, the flanges 17, 18, of the respective wheel sections may constitute one of a pair of clamp members for clamping or forming the channels in which is received and clamped the tire, the other member or clamp portion being formed, as indicated at 21, into a ring, having an upturned flange, coöperating with the flanges 17, 18, as clearly shown, the auxiliary ring portion 21, being bolted to the peripheral portion of the wheel by stud bolts 22, or otherwise, as may be desired. In this respect, my invention is not to be limited or restricted.

In order to form a filler or backing to receive the securing bolts for the flange of the axle or hub flange, I propose to insert filler strips or blocks indicated at 23, 24, of wood or other suitable material, into the pockets or channels formed in the spokes at the axle opening 13, of the wheel. The filler pieces may be of wood or other suitable material, and are provided with bolt holes or openings 24, 25, through which securing bolts may pass for attaching the wheel or axle flange to the side 8, of the wheel. By this arrangement it will be observed that I avoid the danger of bending, marring or otherwise distorting the shape of the wheel by the bolts which secure the same to the axle flange.

Having now set forth the object and nature of my invention and a construction embodying the principles thereof, what I claim as new and useful, and of my own invention, and desire to secure by Letters Patent, is:—

A vehicle wheel formed of sheet metal sections, each section formed of a one-piece stamping with a central hub portion, spoke portions and a circular rim or peripheral portion, the edges of each spoke portion having inwardly turned flanges, said sections being assembled the one against the other with corresponding inturned spoke flanges, hub and rim portions registering flatwise against each other and integrally secured together.

In testimony whereof I have hereunto set my hand in the presence of the subscribing witnesses, on this 14th day of February, A. D. 1913.

EDWARD GOWEN BUDD.

Witnesses:
 FRED. C. GEHRING,
 LOUIS FROHMAN.